United States Patent [19]

Boll

[11] Patent Number: 5,443,285
[45] Date of Patent: Aug. 22, 1995

[54] INFLATABLE PASSENGER COLLISION PROTECTION ARRANGEMENT

[75] Inventor: Wolf Boll, Weinstadt, Germany

[73] Assignee: Mercedes-Benz AG, Stuttgart, Germany

[21] Appl. No.: 109,239

[22] Filed: Aug. 20, 1993

[30] Foreign Application Priority Data

Aug. 20, 1992 [DE] Germany .................. 42 27 528.8

[51] Int. Cl.⁶ .................................................. B60R 21/20
[52] U.S. Cl. .................................... 280/732; 49/248; 224/282; 280/753
[58] Field of Search ................ 280/732, 730 R, 751, 280/752, 753; 224/282, 281, 280; 180/90; 296/37.12, 70; 49/248

[56] References Cited

U.S. PATENT DOCUMENTS

| 2,202,277 | 5/1940 | Visser | 180/90 |
| 4,596,416 | 6/1986 | Muller | 224/282 |

FOREIGN PATENT DOCUMENTS

| 3708744 | 4/1988 | Germany . | |
| 3800652 | 3/1991 | Germany . | |
| 4209604 | 10/1992 | Germany . | |
| 4141239 | 6/1993 | Germany | 296/37.12 |
| 1444219 | 7/1976 | United Kingdom | 49/248 |
| 8001267 | 6/1980 | WIPO | 280/730 R |

*Primary Examiner*—Eric D. Culbreth
*Attorney, Agent, or Firm*—Evenson, McKeown, Edwards & Lenahan

[57] ABSTRACT

A vehicle exhibits a dashboard having a glove compartment, the receiving space of which can be covered by a cover which is movably secured on the dashboard and which, for opening the glove compartment, is disposed so as to be movable approximately in the vertical direction within the vehicle. At least the folded airbag casing of a passenger airbag is here accommodated and fastened in a cavity of the cover, a cap covering the cavity of the cover being able to be opened as the airbag casing unfolds in the direction of the vehicle interior.

9 Claims, 1 Drawing Sheet

INFLATABLE PASSENGER COLLISION PROTECTION ARRANGEMENT

BACKGROUND AND SUMMARY OF THE INVENTION

The invention relates to a passenger collision protection arrangement at a vehicle dashboard of the type including a glove compartment with a cover facing a passenger space.

Passenger collision protection devices are known in which a gasbag (airbag) is disposed recessed in a receptacle in the place of an original glove compartment in the dashboard in front of the passenger seat. The construction space for a storage compartment in the dashboard is thereby either severely restricted or even completely taken up.

In addition, arrangements have also been described in which the airbag is accommodated above the glove compartment (See German Patent Document DE 38 00 652 C2).

By virtue of the subsequently published German Patent Document DE 42 09 604 A1, the arrangement of an airbag in the cover of a glove compartment is also finally known. The cover is in this case, however, configured as a flap which is pivotable in the usual manner about a swivel point situated on the bottom edge, as a result of which the airbag, in the opening attitude of the flap, is unable to fulfill its protective function.

An object of the invention is to accommodate an airbag unit of a passenger collision protection system on the dashboard in a manner designed to save construction space.

This object is achieved according to the invention by an arrangement comprising a glove compartment disposed at a vehicle dashboard in facing relationship to a passenger space, a cover-linkage support arrangement supporting the cover for movement between a closed position covering the glove compartment and an open position opening the glove compartment for access from the passenger space side, an airbag accommodating cavity in the cover for accommodating a folded airbag casing, and a cap covering the cavity at its side facing the passenger space, said cap being openable in response to propellant gas expansion and unfolding of the airbag casing to accommodate expansion of the airbag casing to protect a passenger impacting thereagainst in the event of a vehicle collision, wherein the cover linkage support arrangement is configured so that the cover is guided for movement between the closed and open positions while maintaining the cover and cap in facing relation to the passenger space to thereby accommodate effective utilization of the airbag casing to protect a passenger in both the open and closed positions of the cover.

The accommodation of the passenger collision protection and, at the same time, at least the folded airbag or gasbag within the cover of a glove compartment keeps the receiving space of the glove compartment free for the accommodation of other articles. The effective unfolding of the airbag for the protection of a colliding passenger is herewith possible with a closed glove compartment as well as with an open glove compartment. For the opening of the glove compartment in especially preferred embodiments, the cover is disposed so as to be movable approximately in the vertical direction within the vehicle and the gasbag can be unfolded in each case in the direction of the passenger following the controlled opening of the cover.

Given an adequate size of the cavity of the cover, the contour of which can also be of somewhat arched configuration in the direction of the vehicle interior, it is also possible to secure within the cover a propellant means for the unfolding of the airbag casing. In another embodiment of the airbag, connected to the cover are gas pipes, through which the airbag casing can be filled, in a controlled manner, from a gas reservoir in the vehicle.

The cover can be pivoted by guide rods, which are configured and attached in such a way that the cover is moved approximately in the vertical direction within the vehicle in order to obtain, in every position of the cover, a favorable unfolding direction for the airbag casing. This requirement is also fulfilled, where the prospect of attaching the guide rods in the dashboard is unfavorable, by a link four-bar coupler, which allows the cover to be displaced in such a way that the center of gravity of the unfolded airbag volume remains approximately fixed in place irrespective of the opening attitude of the glove compartment cover.

In a simpler embodiment, instead of the four-bar coupler, a link parallelogram or a connecting link guide could be provided. For safety reasons, the necessary guide rods can be pivotably attached, recessed in the dashboard, at the side of the receiving space of the glove compartment, a respective swivel shaft for the guide rods of the cover being concealed by the cover, in a visually attractive manner, from the vehicle interior. In order to be able advantageously to support the impact forces exerted upon the filled airbag casing, embodiments are contemplated where provisions are made to secure the position of the cover, as the airbag casing unfolds, by a locking means acting upon the guide rods, or also to pressurize the cover, by virtue of the impact forces, in the direction of closing and to latch-lock the cover in the closed position.

Other objects, advantages and novel features of the present invention will become apparent from the following detailed description of the invention when considered in conjunction with the accompanying drawings.

DETAILED DESCRIPTION OF THE DRAWINGS

Figure 1:
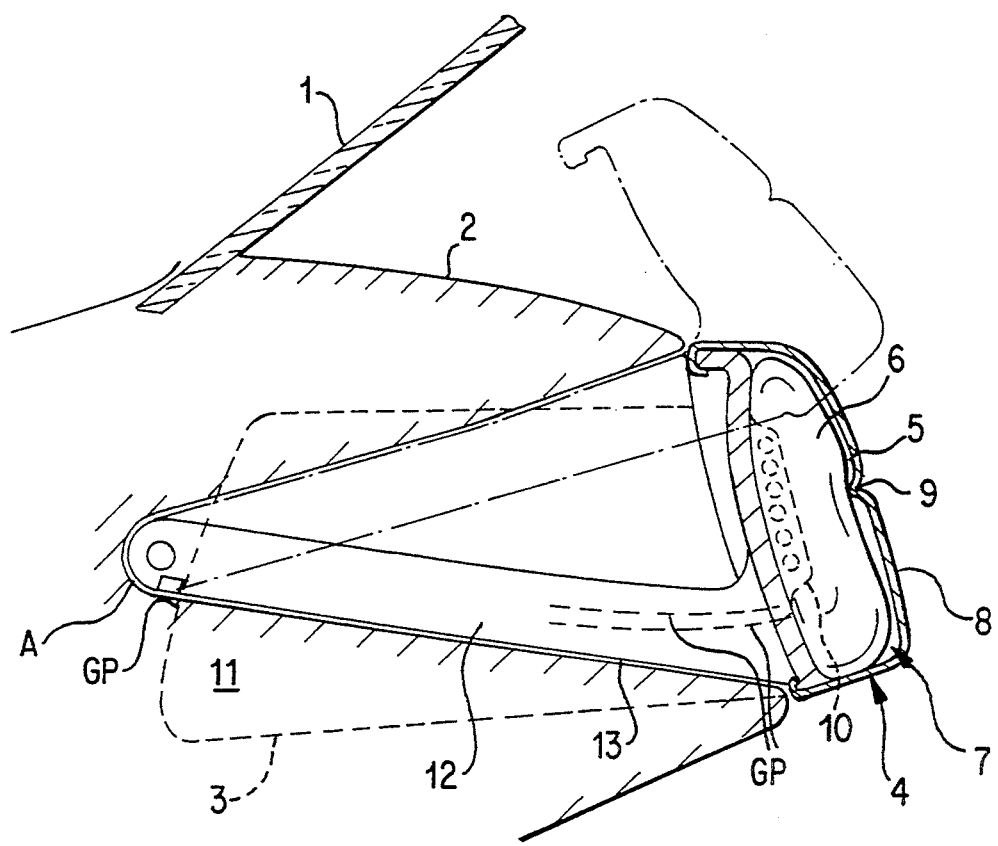
FIG. 1 is a schematic sectional side view of a passenger airbag secured in a pivotable cover of a glove compartment, in an arrangement constructed according to a preferred embodiment of the invention.
Figure 2:
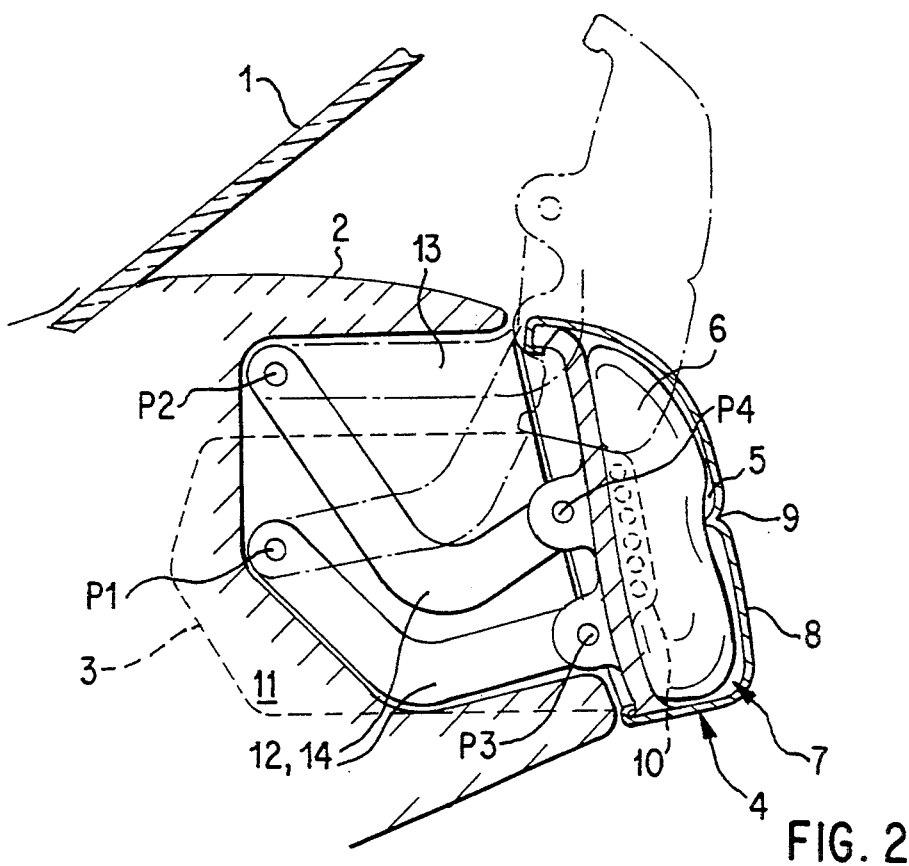
FIG. 2 is a view similar to FIG. 1, showing another embodiment with a passenger airbag in a cover which is attached via a link four-bar coupler.

In FIGS. 1 and 2, a dashboard 2 disposed beneath a windscreen 1 in a vehicle (not further represented) is represented. On the passenger side of dashboard 2 a glove compartment 3 is incorporated, the access aperture of which is covered in the direction of the passenger compartment by a pivotable cover 4, this being shown in dash-dot representation in a position exposing the access aperture. This cover 4 exhibits a cavity 5, in which a folded gasbag or airbag casing 6 of a passenger airbag 7 is fastened. The cavity 5 is here formed, above the folded-up gasbag casing 6, by a cap 8 of the cover 4. In the event of an accident involving the vehicle, the airbag casing 6 is filled with gas, which thereupon ruptures the cap 8 at a preformed tearing seam 9 and swivels the cap halves upwards and downwards, after which the filled airbag casing 6 protects an impacting passenger from collision with the dashboard 2 or the windscreen 1. The propellant for filling the airbag casing 6 is here formed by a gas generator 10, which is likewise accommodated in the cavity 5 of the cap 8 or of the cover 4. It also contemplated in other embodiments, however, to dispose, at a different location in the vehicle, a propellant means or a gas store, from which the gas is then led by means of gas pipes (GP shown in dash lines), for the purpose of filling the gasbag casing 6, to the cover 4. In this way, the receiving space 11 of the glove compartment 3 is not diminished by the built-in passenger gasbag 7.

In order to ensure that the gasbag casing 6 always unfolds in the direction of the passenger seat, the cover 4 is attached so as to be pivotable approximately in the vertical direction within the vehicle for the opening of the glove compartment 3. This is effected by guide rods 12 which are attached to the cover 4 on both sides and which, by virtue of their configuration and arrangement, give rise to a swivel motion by which the cover 4 is pivoted only slightly about an axis A running transversely within the vehicle. The guide rods 12 are pivotably attached, recessed in the dashboard 2 in a respective separate swivel shaft 13, at the side of the receiving space 11 of the glove compartment 3, and the swivel shaft 13, in the closed attitude of the cover 4, is concealed by the cover 4 itself, in a visually attractive manner, from the vehicle interior.

An unfolding of the airbag casing 6 can be effected in every attitude of the cover 4. Embodiments are contemplated with provisions to secure the position of the cover 4, as the airbag casing 6 unfolds, by a locking device (LD shown in dashed lines) acting upon the guide rods 12, e.g. by means of a lockable toothed gearing. Provision can also be made by the arrangement of the guide rods 12 for the cover 4, for the cover, when the filled gasbag casing 6 is subjected to load, to be pushed shut by the passenger and for it to be latch-locked in the closed position.

In FIG. 2, guide rods 12, which have been modified in relation to FIG. 1, are provided in the form of a link four-bar coupler 14 with respective pivot connections P1, P2, P3, P4, by which a pivoting of the cover 4 in the vertical direction within the vehicle can be realized yet more accurately and which enable, in other words, an exact alignment of the filled airbag casing 6 in the direction of the passenger seat.

Although the invention has been described and illustrated in detail, it is to be clearly understood that the same is by way of illustration and example, and is not to be taken by way of limitation. The spirit and scope of the present invention are to be limited only by the terms of the appended claims.

I claim:

1. A passenger restraint arrangement for a motor vehicle, comprising:
   a glove compartment disposed at a vehicle dashboard in facing relationship to a passenger space and having a cover and a receiving space,
   a cover-linkage support arrangement supporting the cover for movement between a closed position covering the glove compartment and an open position opening the glove compartment for access from the passenger space side,
   an airbag accommodating cavity in the cover for accommodating a folded airbag casing,
   and a cap covering the cavity at its side facing the passenger space, said cap being openable in response to propellant gas expansion and unfolding of the folded airbag casing to accommodate expansion of the airbag casing to protect a passenger impacting thereagainst in the event of a vehicle collision,
   wherein the cover linkage support arrangement is configured so that the cover is guided for movement between the closed and open positions while maintaining the cover and cap in facing relation to the passenger space to thereby accommodate effective utilization of the airbag casing to protect a passenger in both the open and closed positions of the cover.

2. Arrangement according to claim 1, wherein a propellant device for unfolding the gasbag casing is secured within the cover.

3. Arrangement according to claim 1, wherein gas pipes are connected to the cover for accommodating filling of the airbag casing in a controlled manner.

4. Arrangement according to claim 1, wherein the cover linkage support arrangement includes pivotable guide rods.

5. Arrangement according to claim 4, wherein the guide rods are pivotably attached, recessed in the dashboard at the side of the receiving space of the glove compartment.

6. Arrangement according to claim 5, wherein a swivel shaft for the guide rods of the cover is concealed by the cover from the vehicle interior in the closed position of the cover.

7. Arrangement according to claim 1, wherein the cover linkage support arrangement includes a link four-bar coupler.

8. Arrangement according to claim 1, wherein the cover is displaceable by a connecting link guide.

9. Arrangement according to claim 1, wherein the cover linkage support arrangement is configured so that the cover is guided to move substantially vertically between its closed and open position.

* * * * *